United States Patent
Basu et al.

(10) Patent No.: US 7,299,239 B1
(45) Date of Patent: Nov. 20, 2007

(54) METHODS FOR PARTITIONING AN OBJECT

(75) Inventors: Subhransu Basu, Fremont, CA (US); Ananth Raghavan, San Francisco, CA (US); Shrikanth Shankar, Mountain View, CA (US); Vikram Shukla, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 574 days.

(21) Appl. No.: 10/308,787

(22) Filed: Dec. 2, 2002

(51) Int. Cl.
*G06F 7/00* (2006.01)
*G06F 17/00* (2006.01)
*G06F 17/30* (2006.01)

(52) U.S. Cl. .................. 707/102; 707/2; 707/100; 707/101

(58) Field of Classification Search ............ 707/104.1, 707/201, 2, 100, 101, 102
See application file for complete search history.

(56) References Cited

U.S. PATENT DOCUMENTS

| | | | |
|---|---|---|---|
| 5,551,027 A * | 8/1996 | Choy et al. ............... 707/201 |
| 2002/0194157 A1* | 12/2002 | Zait et al. ................... 707/2 |
| 2002/0194196 A1* | 12/2002 | Weinberg et al. ........ 707/104.1 |
| 2003/0061263 A1* | 3/2003 | Riddle ....................... 709/104 |

* cited by examiner

*Primary Examiner*—Don Wong
*Assistant Examiner*—Cheryl M Shechtman
(74) *Attorney, Agent, or Firm*—Hickamn Palermo Troung & Becker LLP

(57) ABSTRACT

The concept of partitioning is expanded with a variety of techniques. In particular, one technique involves partitioning an object at multiple levels, where at least one of the levels uses list-based partitioning. Further, a partitioning technique is provided which involves storing a data item in a default partition when the item does not map to any one of the list-based partitions for which a key value group has been defined. Techniques are also provided for efficiently splitting a partition.

12 Claims, 3 Drawing Sheets

METHODS FOR PARTITIONING AN OBJECT

FIELD OF THE INVENTION

The present invention relates to computer systems and more particularly, to techniques for partitioning objects within computer systems and improving performance of access to partitioned objects.

BACKGROUND OF THE INVENTION

In conventional relational database tables, rows are inserted into the table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table (or other database object).

With partitioning, an object, such as a database table, is divided up into sub-tables, referred to as "partitions". The most common form of partitioning is referred to as range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where month equals January, then only the partition associated with the month of January would have to be scanned.

Typically, the criteria used to partition a database object is specified in the statement that creates the database object. For example, the following Structured Query Language (SQL) statement creates a table "sales" that is range partitioned based on date values contained in a column named "saledate":

create table sales
  (saledate DATE,
  productid NUMBER, ... )
  partition by range (saledate)
    partition sal94Q1 values less than to_date (yy-mm-dd, '94-04-01')
    partition sal94Q2 values less than to_date (yy-mm-dd, '94-07-01')
    partition sal94Q3 values less than to_date (yy-mm-dd, '94-10-01')
    partition sal94Q4 values less than to_date (yy-mm-dd, '95-01-01')

Execution of this statement creates a table named "sales" that includes four partitions: sal94Q1, sal94Q2, sal94Q3, and sal94Q4. The partition named sal94Q1 includes all rows that have a date less than 94-04-01 in their saledate column. The partition named sal94Q2 includes all rows that have a date greater than or equal to 94-04-01 but less than 94-07-01 in their saledate column. The partition named sal94Q3 includes all rows that have a date greater than or equal to 94-07-01 but less than 94-10-01 in their saledate column. The partition named sal94Q4 includes all rows that have a date greater than or equal to 94-10-01 but less than 95-01-01 in their saledate column.

When a database server receives a request to perform an operation, the database server makes a plan of how to execute the query. If the operation involves accessing a partitioned object, part of making the plan involves determining which partitions of the partitioned object, if any, can be excluded from the plan (i.e. which partitions need not be accessed to execute the query). The process of excluding partitions from the execution plan of a query that accesses a partitioned object is referred to as "partition pruning".

Unfortunately, conventional pruning techniques can only be applied to a limited set of statements. For example, the database server can perform partition pruning when the statement received by the database server explicitly limits itself to a partition or set of partitions. Thus, the database server can exclude from the execution plan of the statement "select * from sales PARTITION(sal94Q1)" all partitions of the sales table other than the sal94Q1 partition.

The database server can also perform partition pruning on statements that do not explicitly limit themselves to particular partitions, but which select data based on the same criteria that was used to partition the partitioned object. For example, the statement:

select * from sales where saledate between (94-04-01) and (94-06-15)

does not explicitly limit itself to particular partitions. However, because the statement limits itself based on the same criteria (saledate values) as was used to partition the sales table, the database server is able to determine, based on the selection criteria of the statement and the partition definitions of the table, which partitions need not be accessed during execution of the statement. In the present example, the database server would be able to perform partition pruning that limits the execution plan of the statement to sal94Q2.

Similarly, database servers can perform partition pruning for queries with WHERE clauses that (1) specify equalities that involve the partition key (e.g. where saledate=94-02-05), (2) include IN lists that specify partition key values (e.g. where saledate IN (94-02-05, 94-03-06)), and (3) include IN subqueries that involve the partition key (e.g. where salesdate in (select datevalue from T)).

Another form of partitioning is referred to as hash partitioning. According to hash partitioning, one or more values from each record are applied to a hash function to produce a hash value. A separate partition is established for each possible hash value produced by the hash function, and rows that hash to a particular value are stored within the partition that is associated with that hash value. Similar to range based partitioning, hash partitioning increases the efficiency of processing certain types of queries. For example, when a query selects all rows that contain a particular value in the column that is used to perform the hash partitioning, the database server can apply the value in the query to the hash function to produce a hash value, and then limit the scan of the table to the partition that corresponds to the hash value thus produced.

A table that is hash partitioned into four partitions may be created by the following statement:

create table sales
  (saledate DATE,
  productid NUMBER, ... )
  partition by hash (saledate)
  partitions 4;

Similar to range partitions, hash partitions may be used for queries with WHERE clauses that (1) specify equalities that involve the partition key, (2) include IN lists that specify partition key values, and (3) include IN subqueries that involve the partition key. However, unlike range-based partitioning, partition pruning cannot be performed for statements with predicates that specify ranges of partition key values. Consequently, hash-based partitioning is often used when the nature of the partition key is such that range-based queries are unlikely, such as when the partition key is "social security number", "area code" or "zip code".

Another form of partitioning is referred to as list-based partitioning. Similar to hash-based partitioning, list-based partitioning can be used with data values that are discrete and cannot be logically ordered. List-based partitioning gives users precise control over which data belongs in each partition. For each partition, the user can specify a list of key values that map to that partition. The set of key values that are mapped to any given partition are referred to herein as the "key value groups" for that partition.

List partitioning often complements the functionality of range partitioning when used in data warehouses. Range partitioning is useful for segmenting a table along a continuous domain, such as time. Tables in data warehouses are often range-partitioned by time, so that each range partition contains the data for a given range of time values such as one partition per month or per week. In contrast, list-based partitioning is useful for segmenting a table along a discrete domain, such as products. Each partition in a list-partitioned table contains data matching a list of discrete partition-key values.

For example, assume that a data warehouse contains data for many different countries. The user may choose to list partition a large table by the regions europe, north-america, south-america and asia:

create table sales_history ( . . . )

partition by list (country)( partition europe values ('United Kingdom', 'Germany', 'France'), partition north_america values ('United States', 'Canada', 'Mexico'), partition south_america values ('Brazil', 'Argentina'), partition asia values ('Japan', 'Korea')

Rows for any of the countries listed above will automatically be placed in the appropriate regional partitions.

A user may use the partitioning scheme above if data is accessed or modified according to region or country. Regional partitions enable data centers to take advantage of the different time zones of different regions. For example, Europe's night hours overlap American business hours, so the European partition can be maintained while American partitions remain in full operation.

Due to the benefits that result from partition pruning, it is clearly desirable to provide techniques for performing partition pruning for a wider variety of statements.

SUMMARY

Techniques are disclosed for expanding the concept of partitioning in a variety of ways. In particular, techniques are described which involve partitioning an object at multiple levels where at least one of the levels uses list-based partitioning. Further, a partitioning technique is provided which involves storing a data item in a default partition when the item does not map to any one of the list-based partitions for which a key value group has been defined. Techniques are also provided for efficiently splitting a partition.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for partitioning an object are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Partitioning an Object at a Plurality of Levels of Using List-Based Partitioning
3.0 Default Partitions
4.0 Fast-split Partitioning
5.0 Hardware Overview
6.0 Extensions and Alternatives 1.0 General Overview In one embodiment, an object is statically partitioned at a plurality of levels. Partitioning an object at multiple levels is described in detail in U.S. patent application Ser. No. 09/405,980, which is incorporated herein in its entirety. However, unlike the multi-level partitioning described in U.S. patent application Ser. No. 09/405,980, the techniques described herein involve partitioning an object at multiple levels where at least one of the levels uses list-based partitioning. Further, a partitioning technique is provided which involves storing a data item in a "default partition" when the item does not map to any one of the list-based partitions for which a key value group has been defined. Techniques are also provided for efficiently splitting a partition.

2.0 Partitioning an Object at a Plurality of Levels Using List-Based Partitioning According to one embodiment, a partitioning technique is provided which involves partitioning an object at a plurality of levels in which at least one of the plurality of levels is partitioned using list-based partitioning. For example, a table may be partitioned using range-based partitioning to create a set of first-level partitions. Then list-based partitioning may be applied to each of the first-level partitions to create a second level of partitions.

Figure 1:
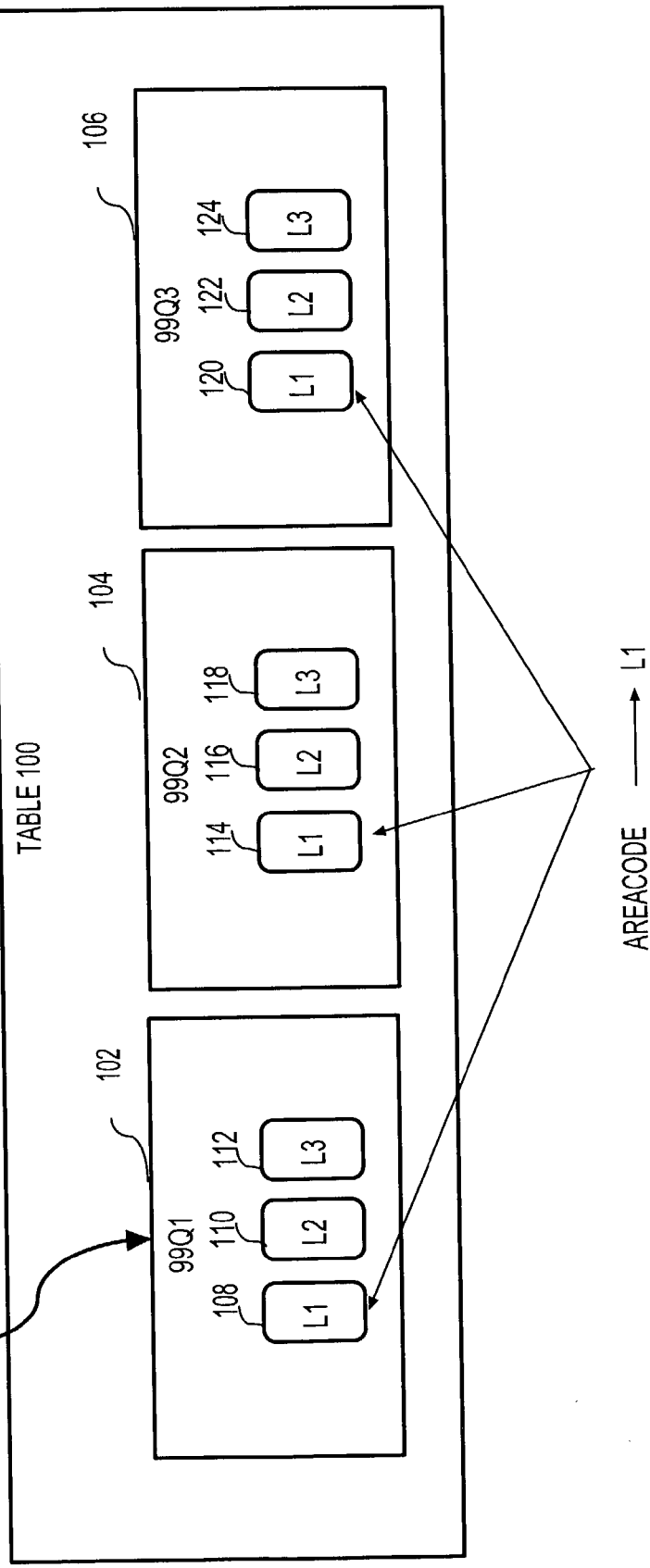
FIG. 1 is a block diagram illustrating a table partitioned using range-list partitioning, according to one embodiment.

In one embodiment, at least one of the plurality of levels of partitioning is made using range-based partitioning. FIG. 1 illustrates table 100 that has been partitioned using range-based partitioning at the first level, and list-based partitioning at the second level. At a first level, table 100 has been partitioned using range-based partitioning on the first level partitioning key "date". At the second level, each partition created at the first level has been partitioned using list-based partitioning on the second level partitioning key "areacode".

When a row is inserted in table 100, the appropriate partition for the row is determined based on partitioning rules that apply to each level, and the value that the row has for the partitioning key used at that level. For example, assume that a row is inserted into table 100, and that within the row, "date=99-02-02" and "areacode=408". The appropriate first-level partition is selected by determining which of first-level partitions 102, 104 and 106 is associated with the range into which "date=99-02-02" falls. In the present example, partition 104 is selected. As described in greater detail hereafter, the appropriate second-level partition of second-level partitions 114, 116, 118 is selected based on which key value group area code 408 belongs to. Assuming that "408" is a member of a key value group associated with partition 116, partition 116 is selected. Having arrived at the lowest level of partitioning, the row is stored within partition 116.

In one embodiment, a statement may select rows from table 100 based on both partitioning keys. For example, a statement may select rows from table 100 where "date=99-02-02" and "areacode=408". By inspecting the partitioning metadata associated with table 100, it is determined that the selection criteria used in the statement uses the first and second-level partitioning keys associated with table 100. Therefore, partition pruning is performed at the first and second levels. In the present example, it is determined that "99-02-02" falls within the range associated with partition 104, and that "408" is a member of the key value group corresponding to partition 116. Therefore, all partitions except partition 116 are excluded from the execution plan of the query during partition pruning.

The example given in FIG. 1 illustrates statically partitioning a table at two levels, where the first level of partitions are formed using range-based partitioning, and the second level of partitions are formed using list-based partitioning. However, the techniques described herein apply to any multiple-level static partitioning scheme in which partitions at one or more of the levels are formed using list-based partitioning. For example, rather than using range and list partitioning for the first and second levels, respectively, the first level of partitions may be constructed using list-based partitioning, and the second level may be constructed using range-based partitioning. Further, instead of or in addition to combining list-based partitioning with range-based partitioning, list-based partitioning may be combined with any other form of partitioning, such as hash-based partitioning. For example, a single table may be partitioned at five levels, where the partitions at the first and third levels are formed using list-based partitioning, the partitions at the second and fifth levels are formed using range-based partitioning, and the partitions at the fourth level are formed using hash-based partitioning.

When partitioning an object at a plurality of levels, each of the partitions at the Nth level may partitioned in a different manner than the other Nth-level partitions to produce N+1 level partitions. For example, each partition that is created at a first level may itself be partitioned using list-based partitioning to produce second level partitions. However, the key value groups used to partition each of those first-level partitions may be different from the key value groups used to partition each of the other first-level partitions. For example, partitions 114, 116 and 118 may correspond to key value groups {202, 415}, {408, 703}, and {714}, respectively. However, partitions 120, 122 and 124 may correspond to key value groups {714, 202}, {408, 415}, and {703}, respectively.

In many situations, it may be desirable for the same partitioning scheme to be applied to all of the Nth level partitions to create the N+1 level partitions. Therefore, in one embodiment, a "template" mechanism is provided. Using the template mechanism, a user is able to specify one set of key value groups, and have those same key value groups automatically used to partition every Nth level partition to form N+1 level partitions.

For example, referring again to FIG. 1, a user may define a template that specifies the key value groups {202, 415}, {408, 703}, and {714}. That template may then be used as the partitioning criteria for all of first level partitions 102, 104 and 106 of table 100.

By applying a template to partitions on a per level basis, instead of a per partition basis, a large range-list table, for example, may be created without having to specify a large number of SQL statements, and the partitioned table has symmetry in which the partitions have the exact same metadata. Thus, second-level partitions 108, 114 and 112 would all be associated with key value group {202, 415}, second-level partitions 110, 116 and 122 would all be associated with key value group {408, 703}, and second-level partitions 112, 118 and 124 would all be associated with the key value group {714}.

3.0 Default Partitions

Figure 2:
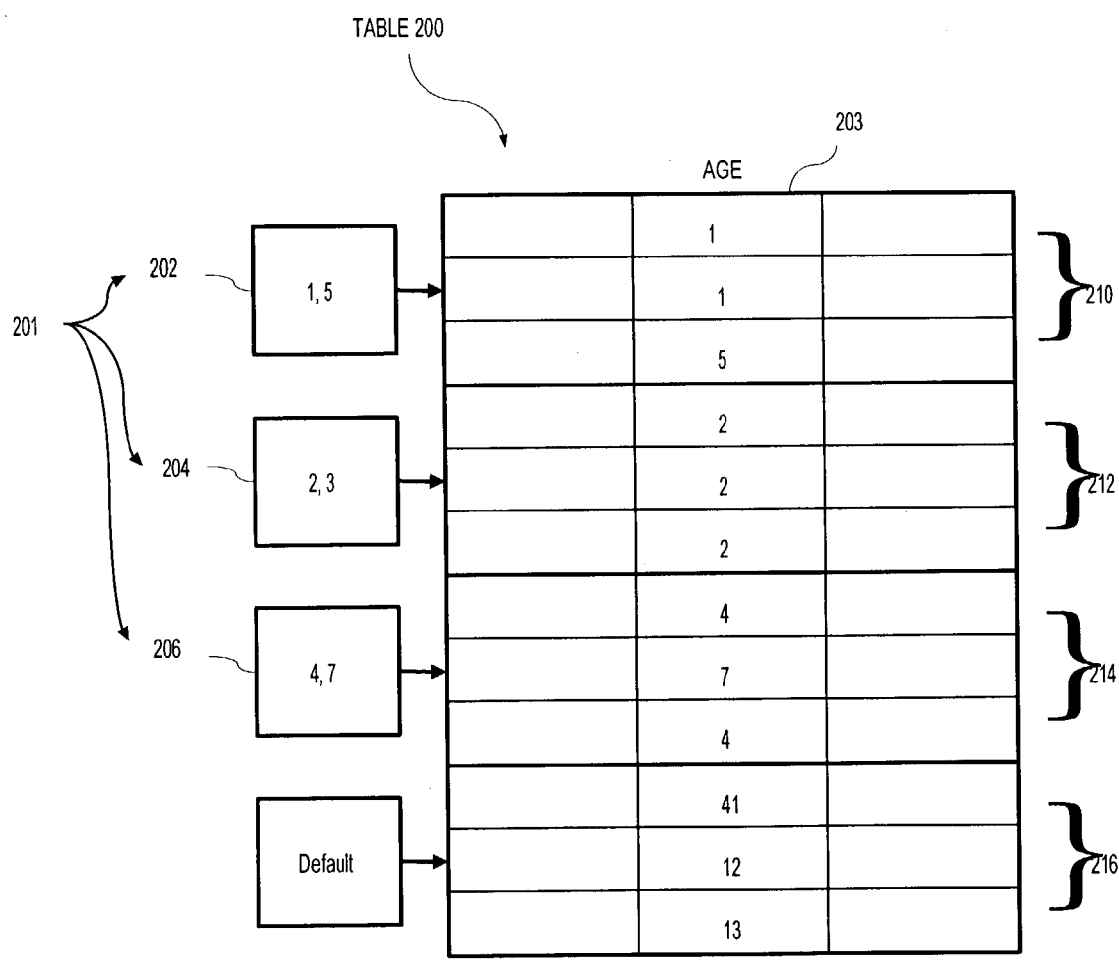
FIG. 2 is a block diagram illustrating a partitioned table including a default partition, according to one embodiment.

According to one embodiment, a partitioning technique is provided which involves storing data items in a "default partition" when the data items have key values that do not belong to any key value group. Referring to FIG. 2, metadata that is stored for table 200 includes a set of key value groups 201. In the illustrated example, the set of key value groups 201 includes key value groups 202, 204, and 206. Each key value group 202, 204, and 206 of table 200 corresponds to a different partition 210, 212 and 214, respectively, and includes those key values that map to the corresponding partition. The set of key value groups 201 includes all key value groups 202, 204 and 206 for table 200.

In one embodiment, key value groups 202, 204 and 206 are established, and table 200 is divided into a plurality of partitions 210, 212 and 214, in which each key value group corresponds to a different partition of the plurality of partitions. Assume a request is received to insert a data item into table 200 whose key value is not a member of any key value group in the set of key value groups 201. For example, a request is received to insert a data item into table 200 whose key value is "6". The key value "6" is not a member of any key value group in the set of key value groups 201. In response to receiving the request, the data item that does not correspond to any of the key value groups 202, 204 and 206 is stored in a default partition 216. In the present example, the data item whose key value is "6" is stored in default partition 216 of table 200.

In one embodiment, in response to a request to add a key value to key value group 202, 204 or 206, default partition 216 is inspected to determine whether default partition 216 has any data items that correspond to the key value to be added. If any data items in default partition 208 have as their key value the key value to be added, then the data items are moved from default partition 216 to the partition associated with the key value group to which the new key value is being added.

For example, assume a request is received to add key value "12" to key value group 206 in table 200. In response to receiving this request, default partition 216 is inspected to determine whether default partition 216 has a data item associated with key value "12". As illustrated in FIG. 2, default partition 216 contains data item "12" which has key value "12". Therefore, data item "12" is moved from the default partition 216 to the partition 214 associated with key value group 206, which is the partition to which the key value is to be added.

In another embodiment, if any data items in default partition 216 have as their key value the key value to be added, an error message is generated. In the present example, an error message would be generated because a data item in default partition 216 has as its key value "12", which is the key value to be added to key value group 206.

4.0 Fast-Split Partitioning

Techniques are described herein for splitting partitions in an efficient manner, referred to herein as fast-split partitioning. The techniques may be used to split a partition of a table that has been statically partitioned. Prior to a fast-split operation, the partition that is to be split will have a corresponding definition. The partition definition specifies a criteria for data items in the original partition. For example, with respect to list-based partitioning, the partition definition is the key value group that defines which data items are included in the corresponding partition. In range-based partitioning, the partition definition may be values that define a particular range, such as 1 to 100.

During the split operation, the database system receives partition definitions for the new partitions into which the existing partition is to be split. According to one embodiment, it is determined whether only one partition of the plurality of new partitions would include any data that currently exists in the existing partition. For example, in Table 2, assume a request is received to split partition 212 into a first new partition with data items associated with key value "2" and a second new partition with data items associated with key value "3". Upon inspection, it is determined that only the first partition would include data that currently exists in partition 212, as partition 212 only contains the value "2", which is associated with key value "2". Because all of the data in the existing partition would go into only one of the new partitions, this partition split operation is a candidate for the "fast-split" technique.

In one embodiment, a fast-split operation is performed when a set of conditions is satisfied, where one of the conditions is that one partition of the plurality of new partitions would include all data items that exist in the existing partition. When the plurality of conditions is satisfied, then the fast-split operation is performed by using the existing partition as the new non-empty partition. Metadata for the table is simply updated to update the definition of the existing partition, and to establish each other new partitions. In the present example, the first new partition associated with key value "2" would contain data item "2" that exists in the existing partition, and the second new partition associated with key value "3" would be empty. Therefore, the existing partition 212 is used as the new non-empty partition, the definition for the existing partition 212 is updated to indicate that its key value group is now {2}, and the metadata associated with a new partition, associated with key value group {3}, is created.

In one embodiment, the set of conditions to be satisfied includes the condition that the storage characteristics specified for the new non-empty partitions are the same as the storage characteristics that exist for the existing partition. Examples of storage characteristics include table space, initial extents or next extents.

In one embodiment, the step of determining whether a partition is empty includes formulating queries associated with the new partitions and executing the queries against that existing partition. For example, Structured Query Language (SQL) statements may be issued against the existing partition see if the existing partition returns rows from each of the new partitions. Thus, in the example given above, an SQL query can be issued against partition 204 to see if partition 204 contains any data items with key value "2", and another query can be issued against partition 204 to see if partition 204 contains any data items with key value "3". In this case, only the first query will return rows. Based on this information, the database server knows that all of the data in the existing partition will belong to the new partition associated with the key value group {2}.

An index is a data structure that belongs to a table or cluster, which is used to locate requested data faster than scanning the entire object. Given a certain data value, the index points directly to the location of the data. Partitions exist in both index as well as table objects. Two types of partitioned indexes are local indexes and global indexes. In a partitioned table, a user may create a local index, in which every table partition has exactly one corresponding local index partition. A user may also create a global index, which is partitioned independently of the base table. Therefore there may not be a one-to-one correspondence between global index partitions and base table partitions.

In one embodiment, following a fast split operation, the global indexes for the partitioned table remain useable. If the storage characteristics specified for the local index for the new non-empty partition are the same as the storage characteristics for the existing partition, then the local index of the existing partition is useable.

5.0 Hardware Overview

Figure 3:
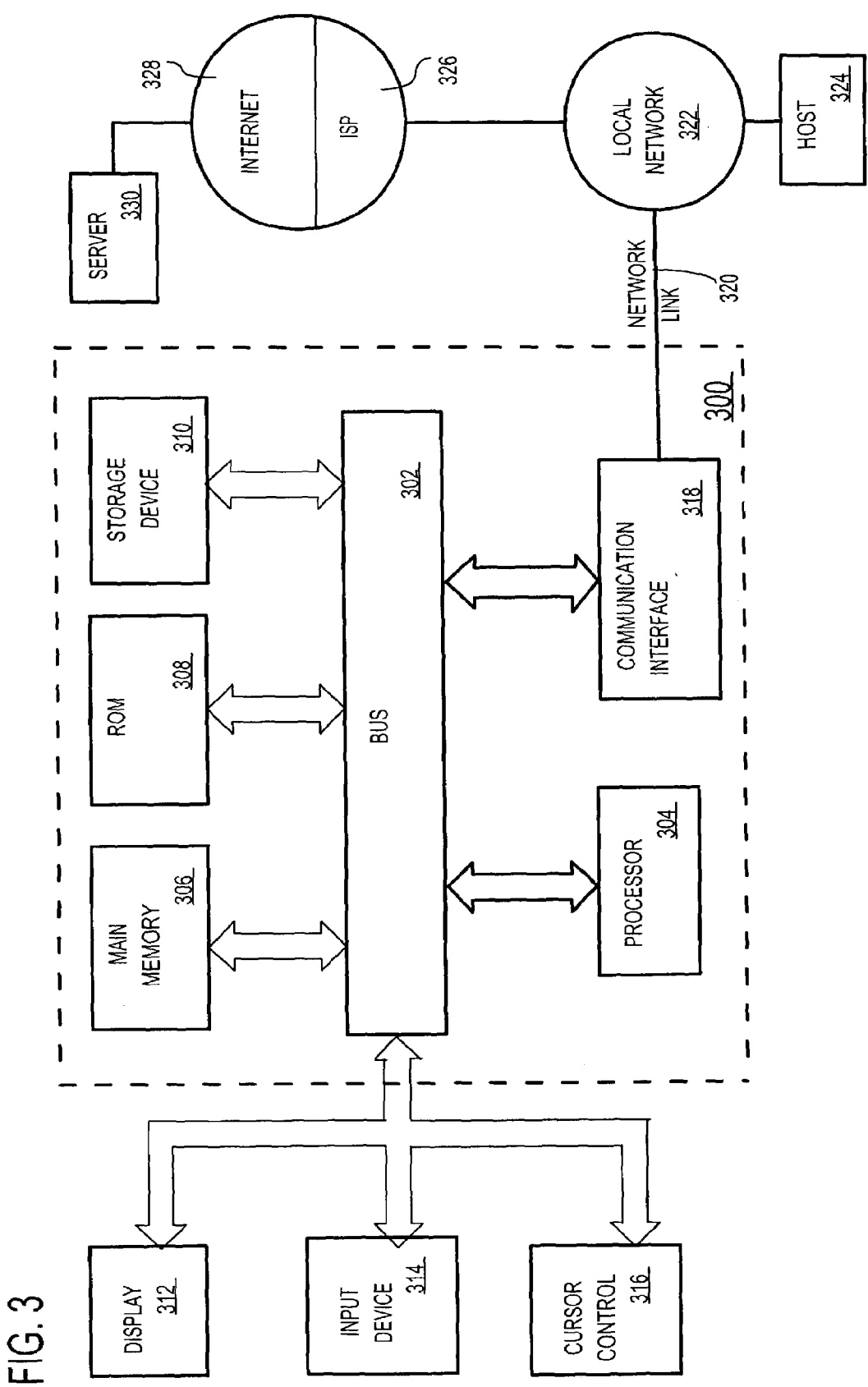
FIG. 3 is a block diagram illustrating a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method of partitioning a table that comprises a plurality of rows that each contain data, the method comprising:

statically partitioning said table at a plurality of levels, wherein the step of statically partitioning said table at a plurality of levels includes the steps of:

(a) statically partitioning said table at a first level based on a first criteria to create a first set of table partitions, wherein each table partition in the first set of partitions is a distinct subtable of said table and contains a distinct subset of said plurality of rows relative to the other table partitions in the first set; and (b) statically partitioning said table at a second level based on a second criteria to create a second set of table partitions, wherein each table partition in the second set of table partitions is a distinct subtable of said table and contains a distinct subset of said plurality of rows relative to the other partitions in the second set, wherein said first set of table partitions is different than said second set of table partitions, and wherein said table is partitioned at one or more of said plurality of levels using list-based partitioning;

wherein partitioning said table using list-based partitioning results in a particular set of table partitions;

wherein each table partition in the particular set of table partitions is associated with an explicitly enumerated set of key values;

wherein the explicitly enumerated set of key values that is associated with each table partition in the particular set of table partitions has no key values in common with the explicitly enumerated set of key values associated with any other of the table partitions in the particular set of table partitions;

wherein, for each table partition in the particular set of table partitions, each row in said table partition contains a value from the explicitly enumerated set of key values that has been assigned to said table partition.

2. The method of claim 1, wherein at least one of the levels is partitioned using range-based partitioning.

3. A computer-readable storage medium carrying instructions which, when executed by one or more processors, cause said one or more processors to perform the method recited in claim 2.

4. The method of claim 1, wherein at least one of the levels is partitioned using hash-based partitioning.

5. A computer-readable storage medium carrying instructions which, when executed by one or more processors, cause said one or more processors to perform the method recited in claim 4.

6. The method of claim 1, wherein at least another one of the levels is partitioned using list-based partitioning.

7. A computer-readable storage medium carrying instructions which, when executed by one or more processors, cause said one or more processors to perform the method recited in claim 6.

8. The method of claim 1, wherein:

partitions at said second level are created by statically partitioning each partition created at said first level; and each partition at said first level is statically partitioned using an identical partitioning criteria to produce said partitions at said second level.

9. The method of claim 8 wherein the step of partitioning each partition created at said first level includes the steps of:

defining a template that specifies partitioning criteria; and using the partitioning criteria specified in said template to partition all partitions created at said first level.

10. A computer-readable storage medium carrying instructions which, when executed by one or more processors, cause said one or more processors to perform the method recited in claim 9.

11. A computer-readable storage medium carrying instructions which, when executed by one or more processors, cause said one or more processors to perform the method recited in claim 8.

12. A computer-readable storage medium carrying instructions which, when executed by one or more processors, cause said one or more processors to perform the method recited in claim 1.

\* \* \* \* \*